United States Patent
Cooley

(10) Patent No.: US 8,955,092 B2
(45) Date of Patent: Feb. 10, 2015

(54) SYSTEMS AND METHODS FOR ELIMINATING REDUNDANT SECURITY ANALYSES ON NETWORK DATA PACKETS

(71) Applicant: Symantec Corporation, Mountain View, CA (US)

(72) Inventor: Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 115 days.

(21) Appl. No.: 13/686,099

(22) Filed: Nov. 27, 2012

(65) Prior Publication Data

US 2014/0150081 A1    May 29, 2014

(51) Int. Cl.
*H04L 29/06* (2006.01)
*H04L 29/08* (2006.01)

(52) U.S. Cl.
CPC ............... *H04L 63/02* (2013.01); *H04L 67/30* (2013.01); *H04L 63/1433* (2013.01); *H04L 63/145* (2013.01); *H04L 67/28* (2013.01); *H04L 63/1408* (2013.01)
USPC .......................................................... 726/11

(58) Field of Classification Search
CPC ............................... G06F 11/30; H04L 29/06
USPC ....................... 726/11, 1; 713/151
See application file for complete search history.

(56) References Cited

U.S. PATENT DOCUMENTS

| | | | |
|---|---|---|---|
| 6,510,154 B1 * | 1/2003 | Mayes et al. | 370/389 |
| 7,076,650 B1 * | 7/2006 | Sonnenberg | 713/151 |
| 7,891,001 B1 | 2/2011 | Greenawalt et al. | |
| 8,505,107 B2 * | 8/2013 | Lee et al. | 726/29 |
| 2002/0095588 A1 * | 7/2002 | Shigematsu et al. | 713/186 |
| 2002/0178381 A1 | 11/2002 | Lee et al. | |
| 2007/0006288 A1 | 1/2007 | Mayfield et al. | |
| 2009/0313682 A1 | 12/2009 | Rajput et al. | |
| 2010/0115582 A1 * | 5/2010 | Sapp et al. | 726/1 |

* cited by examiner

*Primary Examiner* — Teshome Hailu
*Assistant Examiner* — Thanh Le
(74) *Attorney, Agent, or Firm* — ALG Intellectual Property, LLC

(57) ABSTRACT

A computer-implemented method for eliminating redundant security analyses on network data packets may include (1) intercepting, at a networking device, at least one network data packet destined for a target computing device, (2) identifying a security system installed on the target computing device, (3) determining that the security system installed on the target computing device does not satisfy a predefined security standard, and then (4) performing a security analysis that satisfies the predefined security standard on the network data packet at the networking device based at least in part on determining that the security system installed on the target computing device does not satisfy the predefined security standard. Various other methods, systems, and computer-readable media are also disclosed.

20 Claims, 6 Drawing Sheets

SYSTEMS AND METHODS FOR ELIMINATING REDUNDANT SECURITY ANALYSES ON NETWORK DATA PACKETS

BACKGROUND

Computer networks often include multiple computing devices that perform substantially similar security analyses on the same network data packets. For example, a computer network may include a gateway device that facilitates transmission of data packets from source computing devices to target computing devices. In this example, upon receiving one or more data packets from a source computing device, the gateway device may perform one or more security analyses (such as an Intrusion Detection System (IDS) analysis, an Intrusion Prevention System (IPS) analysis, an antivirus analysis, and/or a firewall analysis) on the data packets prior to forwarding the same to a target computing device. However, upon receiving the data packets forwarded from the gateway device, the target computing device may redundantly perform the same security analyses on the data packets.

Unfortunately, such redundant security analyses may consume valuable network resources and prevent the computer network from achieving optimum performance. What is needed, therefore, are systems and methods for eliminating redundant security analyses performed by different computing devices included in a computer network without compromising the level of security provided by the network.

SUMMARY

As will be described in greater detail below, the instant disclosure generally relates to systems and methods for eliminating redundant security analyses on network data packets. In one example, a computer-implemented method for eliminating redundant security analyses on network data packets may include (1) intercepting, at a networking device, at least one network data packet destined for a target computing device, (2) identifying a security system installed on the target computing device, (3) determining that the security system installed on the target computing device does not satisfy a predefined security standard, and then (4) performing a security analysis (such as an IDS analysis, an IPS analysis, an antivirus analysis, and/or a firewall analysis) that satisfies the predefined security standard on the network data packet at the networking device based at least in part on determining that the security system installed on the target computing device does not satisfy the predefined security standard.

In some examples, the method may also include providing a cloud-based server that authenticates the target computing device, obtains information about the target computing device (e.g., information that identifies the security system installed on the target computing device, a current status of the security system installed on the target computing device, a calendar date on which the security system was most recently updated, a network address associated with the target computing device, and/or a make or model of the target computing device), and then stores the information about the target computing device to enable the networking device to access the information in order to identify the security system installed on the target computing device.

In some examples, the method may also include obtaining user credentials from a user of the target computing device. In such examples, the method may further include searching an authentication database associated with the cloud-based server for the user credentials obtained from the user of the target computing device. In addition, the method may include identifying the user credentials obtained from the user of the target computing device while searching the authentication database associated with the cloud-based server.

In some examples, the method may also include identifying a destination address associated with the network data packet. In such examples, the method may further include determining that the network data packet is destined for the target computing device by comparing the destination address with the network address specified in the information stored on the cloud-based server. In addition, the method may include identifying the security system specified in the information stored on the cloud-based server upon determining that the network data packet is destined for the target computing device.

In some examples, the method may also include providing the target computing device with an authentication token configured to direct the target computing device to update the information stored on the cloud-based server in response to detecting at least one modification to the security system installed on the target computing device. In such examples, the method may further include receiving an update that identifies the modification to the security system from the target computing device. In addition, the method may include updating the information stored on the cloud-based server to account for the modification to the security system based at least in part on the received update.

In some examples, the method may also include determining that the network data packet does not pose a security risk to the target computing device based at least in part on the security analysis. In such examples, the method may further include forwarding the network data packet from the networking device to the target computing device upon determining that the network data packet does not pose the security risk to the target computing device.

In some examples, the method may also include determining that the network data packet poses a security risk to the target computing device based at least in part on the security analysis. In such examples, the method may further include quarantining the network data packet (instead of forwarding the network data packet from the networking device to the target computing device) upon determining that the network data packet poses the security risk to the target computing device.

In some examples, the method may also include determining that the security system installed on the target computing device satisfies a different predefined security standard. In such examples, the method may further include forwarding the network data packet from the networking device to the target computing device without performing a security analysis that satisfies the different predefined security standard on the network data packet since the security system installed on the target computing device satisfies the different predefined security standard.

In one embodiment, a system for implementing the above-described method may include (1) an interception module programmed to intercept, at a networking device, at least one network data packet destined for a target computing device, (2) an identification module programmed to identify a security system installed on the target computing device, (3) a determination module programmed to determine that the security system installed on the target computing device does not satisfy a predefined security standard, and (4) a security module programmed to perform a security analysis that satisfies the predefined security standard on the network data packet at the networking device based at least in part on the determination that the security system installed on the target computing device does not satisfy the predefined security standard.

In some examples, the above-described method may be encoded as computer-readable instructions on a non-transitory computer-readable-storage medium. For example, a non-transitory computer-readable-storage medium may include one or more computer-executable instructions that, when executed by at least one processor of a networking device, may cause the networking device to (1) intercept at least one network data packet destined for a target computing device, (2) identify a security system installed on the target computing device, (3) determine that the security system installed on the target computing device does not satisfy a predefined security standard, and then (4) perform a security analysis that satisfies the predefined security standard on the network data packet based at least in part on the determination that the security system installed on the target computing device does not satisfy the predefined security standard.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
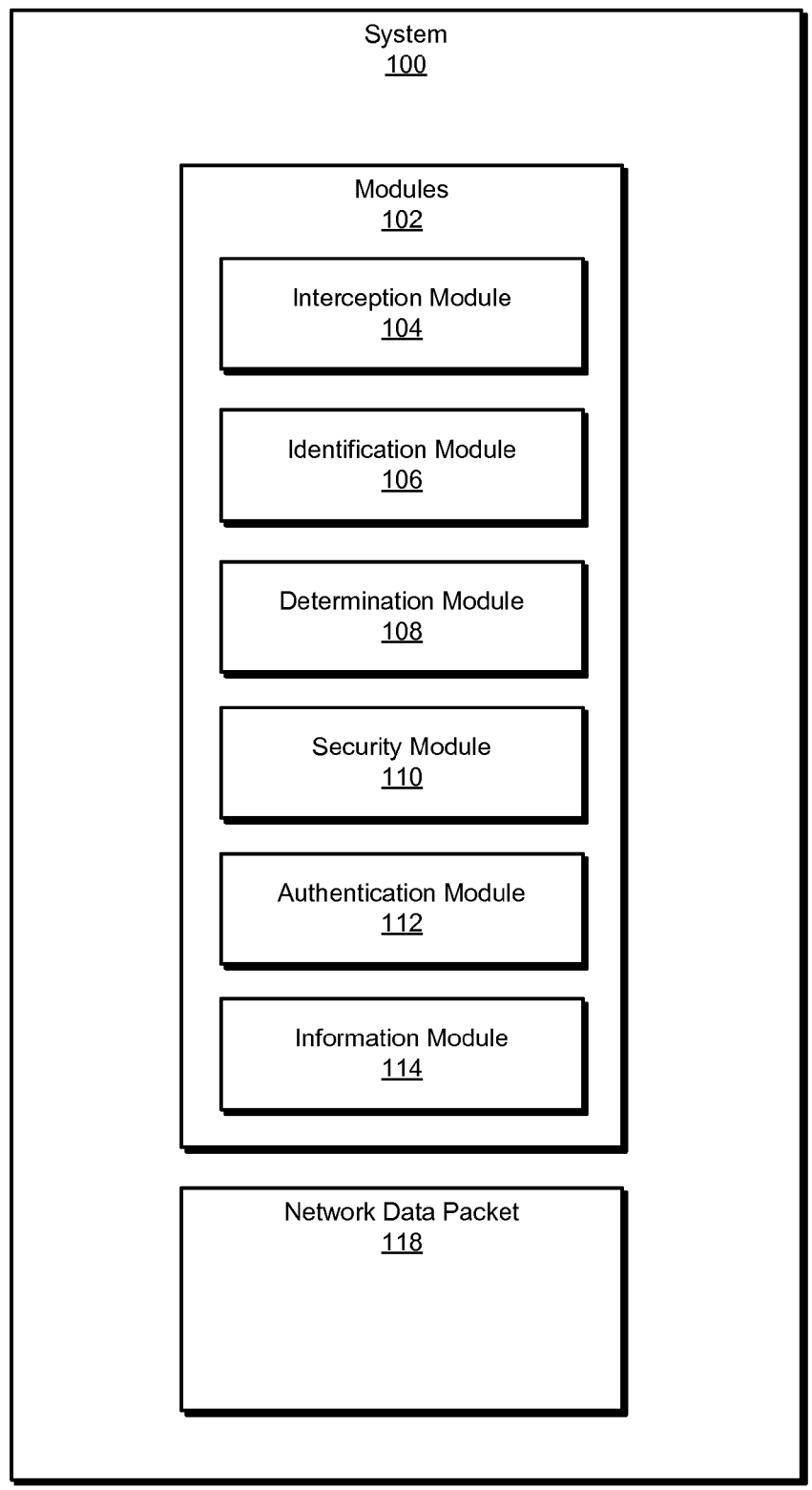
FIG. 1 is a block diagram of an exemplary system for eliminating redundant security analyses on network data packets.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for eliminating redundant security analyses on network data packets. As will be explained in greater detail below, by authenticating computing devices included in a computer network, the various systems and methods described herein may provide a secure computing environment in which the authenticated computing devices are able to expose their security capabilities and/or vulnerabilities without the risk of exploitation by a malicious network participant. By providing the secure computing environment in which the authenticated computing devices are able to expose their security capabilities and/or vulnerabilities without the risk of exploitation by a malicious network participant, the various systems and methods described herein may also enable a networking device (such as a network gateway) to determine whether security systems installed on the authenticated computing devices satisfy a predefined security standard.

In addition, by enabling the networking device to determine whether the security systems installed on the authenticated computing devices satisfy the predefined security standard, the various systems and methods described herein may eliminate redundant security analyses on network data packets destined for the authenticated computing devices. Moreover, by eliminating the redundant security analyses on the network data packets destined for the authenticated computing devices, the various systems and methods described herein may help preserve network resources and/or improve the computer network's overall performance.

Figure 2:
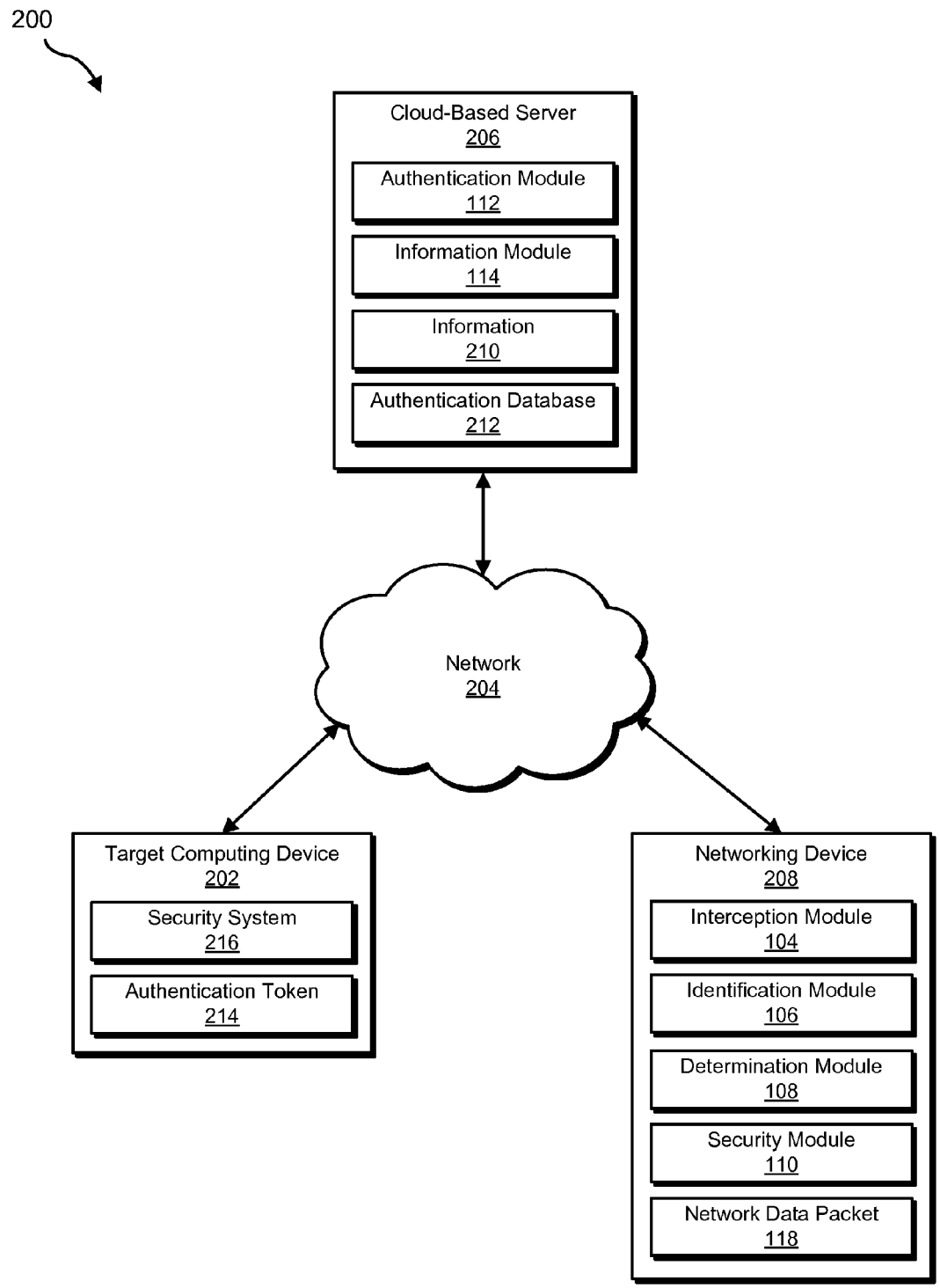
FIG. 2 is a block diagram of an exemplary system for eliminating redundant security analyses on network data packets.

The following will provide, with reference to FIGS. 1-2, detailed descriptions of exemplary systems for eliminating redundant security analyses on network data packets. Detailed descriptions of corresponding computer-implemented methods will be provided in connection with FIG. 3. Detailed descriptions of an exemplary network data packet destined for a target computing device and exemplary information about the target computing device will be provided in connection with FIG. 4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for eliminating redundant security analyses on network data packets. As illustrated in this figure, exemplary system 100 may include one or more modules 102 for performing one or more tasks. For example, and as will be explained in greater detail below, exemplary system 100 may include an interception module 104 programmed to intercept, at a networking device, at least one network data packet destined for a target computing device. Exemplary system 100 may also include an identification module 106 programmed to identify a security system installed on the target computing device.

In addition, and as will be described in greater detail below, exemplary system 100 may include a determination module 108 programmed to determine that the security system installed on the target computing device does not satisfy a predefined security standard. Exemplary system 100 may also include a security module 110 programmed to perform a security analysis that satisfies the predefined security standard on the network data packet at the networking device based at least in part on the determination that the security system installed on the target computing device does not satisfy the predefined security standard.

Moreover, and as will be described in greater detail below, exemplary system 100 may include an authentication module 112 programmed to authenticate the target computing device. Exemplary system 100 may also include an information module 114 programmed to obtain information about the target computing device and store the information about the target computing device to enable the networking device to access the information in order to identify the security system installed on the target computing device. Although illustrated as separate elements, one or more of modules 102 in FIG. 1 may represent portions of a single module or application (such as SYMANTEC'S NETWORK SECURITY).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., target computing device 202, cloud-based server 206, and/or networking device 208), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more network data packets, such as network data packet 118. For example, network data packet 118 may include data that represents all or a portion of a file. In this example, network data packet 118 may include a payload and/or metadata (such as data that identifies the source and/or destination of the payload). In addition, network data packet 118 may originate from the Internet or a source computing device included in a computer network (such as an intranet).

Exemplary system 100 in FIG. 1 may be implemented in a variety of ways. For example, all or a portion of exemplary system 100 may represent portions of exemplary system 200 in FIG. 2. As shown in FIG. 2, system 200 may include a networking device 208 in communication with a target computing device 202 and a cloud-based server 206 via a network 204.

Networking device 208 may be programmed with one or more of modules 102 and/or may have intercepted network data packet 118 destined for target computing device 202. Additionally or alternatively, cloud-based server 206 may be programmed with one or more of modules 102 and/or may store all or a portion of information 210 about target computing device 202 and/or authentication database 212 used to authenticate target computing device 202. Additionally or alternatively, target computing device 202 may include a security system 216 and/or an authentication token 214 used to facilitate updating information 210 stored on cloud-based server 206.

In one embodiment, one or more of modules 102 from FIG. 1 may, when executed by at least one processor of networking device 208 and/or cloud-based server 206, facilitate networking device 208 and/or cloud-based server 206 in eliminating redundant security analyses on network data packets. For example, and as will be described in greater detail below, one or more of modules 102 may cause networking device 208 and/or cloud-based server 206 to (1) intercept network data packet 118 destined for target computing device 202, (2) identify security system 216 installed on target computing device 202, (3) determine that security system 216 installed on target computing device 202 does not satisfy a predefined security standard, and then (4) perform a security analysis that satisfies the predefined security standard on network data packet 118 based at least in part on the determination that security system 216 installed on target computing device 202 does not satisfy the predefined security standard.

Target computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 510 in FIG. 5, and/or any other suitable computing device.

Cloud-based server 206 generally represents any type or form of collection of one or more computing devices capable of authenticating other computing devices included in a computer network and/or storing information about the other computing devices included in the computer network. Examples of cloud-based server 206 include, without limitation, application servers, web servers, storage servers, and/or database servers configured to run certain software applications and/or provide various web, storage, and/or database services.

Networking device 208 generally represents any type or form of computing device capable of intercepting, forwarding, and/or otherwise facilitating transmission of network data packets from one computing device to another. Examples of networking device 208 include, without limitation, network gateways, default gateways, routers, nodes, laptops, tablets, desktops, servers, cellular phones, Personal Digital Assistants (PDAs), multimedia players, embedded systems, combinations of one or more of the same, exemplary computing system 510 in FIG. 5, and/or any other networking devices.

Network 204 generally represents any medium or architecture capable of facilitating communication or data transfer. Examples of network 204 include, without limitation, an intranet, a TCP/IP network, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication among networking device 208, target computing device 202, and/or cloud-based server 206.

Security system 216 generally represents any type or form of security software configured to protect the health of and/or any information stored on a computing device against potentially malicious activity. Examples of security system 216 include, without limitation, stand-alone security systems, security clients incorporated into a distributed or cloud-based security system, antivirus security systems (e.g., SYMANTEC'S NORTON ANTIVIRUS), Internet security systems (e.g., SYMANTEC'S NORTON INTERNET SECURITY), network security systems (e.g., SYMANTEC'S NETWORK SECURITY), firewall security systems, combinations of one or more of the same, and/or any other suitable security systems.

Figure 3:
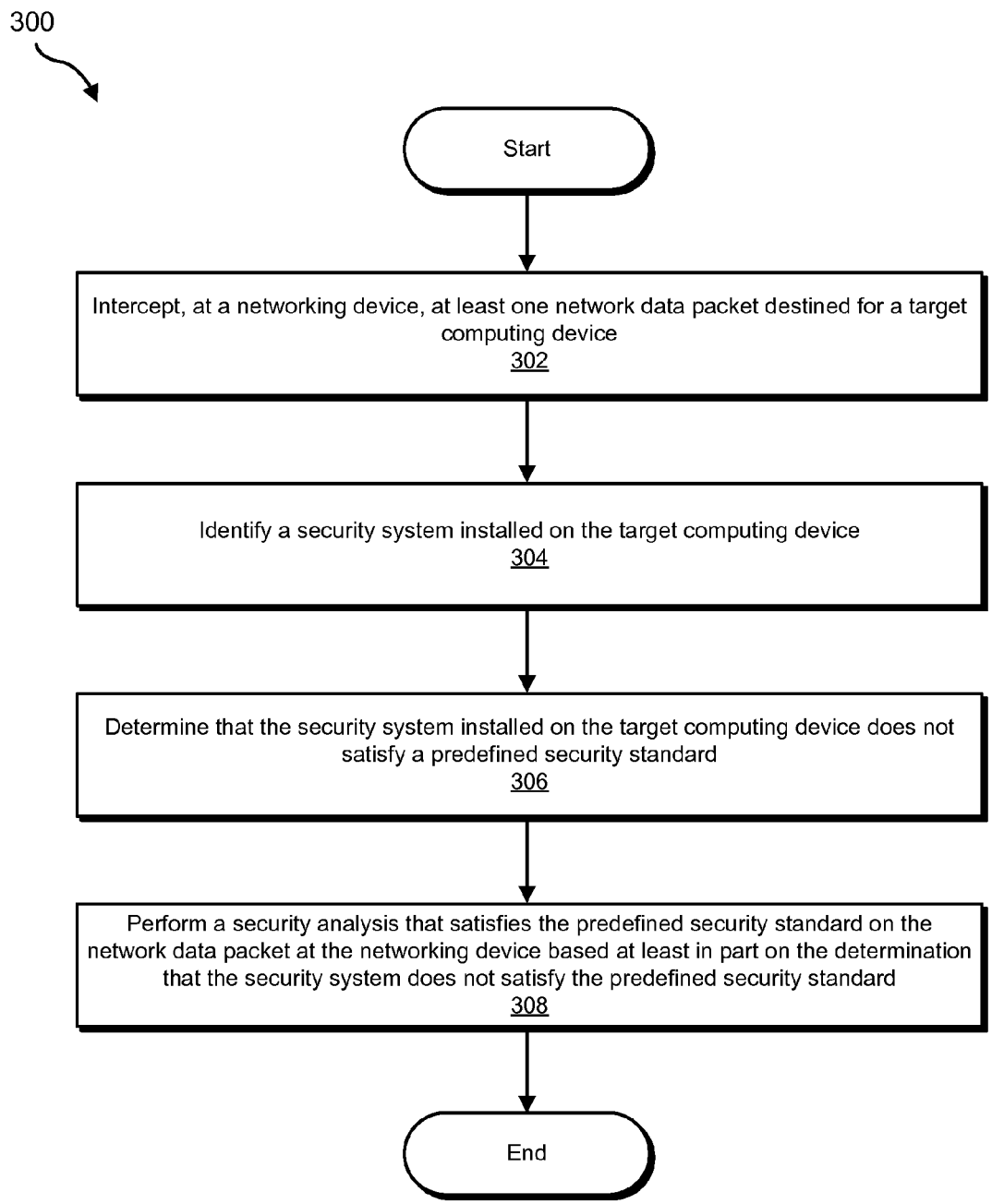
FIG. 3 is a flow diagram of an exemplary method for eliminating redundant security analyses on network data packets.

FIG. 3 is a flow diagram of an exemplary computer-implemented method 300 for eliminating redundant security analyses on network data packets. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the various systems described herein may intercept at least one network data packet destined for a target computing device.

For example, interception module 104 may, as part of networking device 208, intercept network data packet 118 destined for target computing device 202. In this example, network data packet 118 may include data that represents all or a portion of at least one file.

The systems described herein may perform step 302 in a variety of ways. In one example, target computing device 202 may submit a request to obtain certain data stored on a computing device external to the target computing device's network. For example, target computing device 202 may submit a request to download a particular file from a server (not illustrated in FIG. 2) that hosts a website accessible via the Internet. In this example, the server may initiate transmission of network data packet 118 to target computing device 202 in response to the request. Network data packet 118 may include data that represents all or a portion of the file requested by target computing device 202 from the server.

Figure 4:
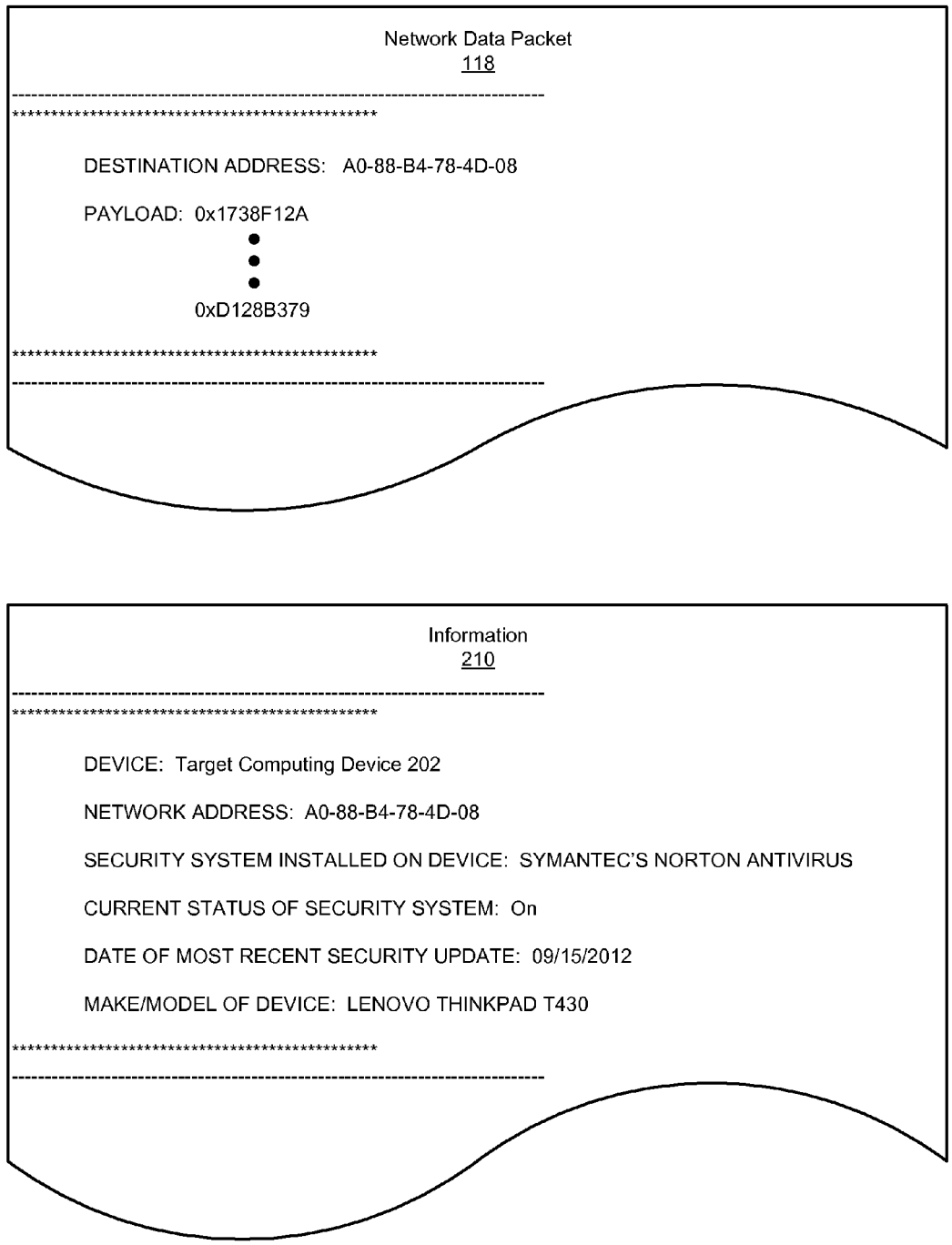
FIG. 4 is an illustration of an exemplary network data packet destined for a target computing device and exemplary information about the target computing device.

As illustrated in FIG. 4, network data packet 118 may include metadata that specifies a destination address associated with a target computing device included in a computer network (in this example, "A0-88-B4-78-4D-08") and a payload that includes data representing all or a portion of at least one file to be downloaded by the target computing device (in this example, "0x1738F12A" through "0xD128B379"). In one example, the destination address identified in the data packet's metadata may include a Media Access Control (MAC) address assigned to target computing device 202.

As network data packet 118 enters the computer network en route to target computing device 202, interception module 104 may intercept network data packet 118 at networking device 208. For example, interception module 104 may receive network data packet 118 at networking device 208 as network data packet 118 advances toward target computing device 202. In this example, and as will be described in greater detail below, networking device 208 may analyze network data packet 118 and prevent network data packet 118 from advancing toward target computing device 202 at least until determining whether the security capabilities of target computing device 202 satisfy a predetermined security standard.

In some examples, networking device 208 may represent a gateway that enables target computing device 202 to receive and/or access data stored on a different computing device included in the same computer network or a different computer network. In one example, networking device 208 may serve as a firewall to the computer network. Additionally or alternatively, networking device 208 may serve as an interface that implements a different communication protocol than the computer network that includes target computing device 202.

As illustrated in FIG. 3, at step 304 one or more of the various systems described herein may identify a security system installed on the target computing device. For example, identification module 106 may, as part of networking device 208, identify security system 216 installed on target computing device 202. In this example, security system 216 may be configured to protect the health of and/or the information stored on target computing device 202 against potentially malicious activity.

The systems described herein may perform step 304 in a variety of ways. In some examples, identification module 106 may access information about target computing device 202 to identify the security system installed on target computing device 202. For example, identification module 106 may request access to information 210 about target computing device 202 from cloud-based server 206. In this example, cloud-based server 206 may verify whether networking device 208 has sufficient administrative authority to access information about target computing device 202 prior to enabling identification module 106 to access information 210. After cloud-based server 206 has verified that networking device 208 has sufficient administrative authority, identification module 106 may access information 210 stored on cloud-based server 206 to identify the security system installed on target computing device 202.

As illustrated in FIG. 4, information 210 may specify the particular computing device (in this example, "Target Computing Device 202"), a network address assigned to the computing device (in this example, "A0-88-B4-78-4D-08"), a security system installed on the computing device (in this example, "SYMANTEC'S NORTON ANTIVIRUS"), the current status of the security system installed on the computing device (in this example, "On"), the date of the security system's most recent security update (in this example, "Sep. 15, 2012"), and the make and/or model of the computing device (in this example, "LENOVO THINKPAD T430").

In one example, identification module 106 may identify the destination address specified in the network data packet's metadata. For example, identification module 106 may analyze the metadata included in network data packet 118 and determine that network data packet 118 is destined for the computing device associated with network address "A0-88-B4-78-4D-08" based at least in part on this analysis. In this example, identification module 106 may compare the destination address specified in the network data packet's metadata with network address "A0-88-B4-78-4D-08" specified in information 210. Identification module 106 may then determine that network data packet 118 is destined for target computing device 202 based at least in part on this comparison.

In one example, upon determining that network data packet 118 is destined for target computing device 202, identification module 106 may identify the security system installed on target computing device 202. For example, identification module 106 may search information 210 for the security system installed on target computing device 202. In this example, identification module 106 may identify security system 216 while searching information 210 for the security system installed on target computing device 202.

Additionally or alternatively, identification module 106 may determine that no security system is currently installed on target computing device 202. For example, target computing device 202 may have yet to install a security system. In this example, identification module 106 may search information about target computing device 202 for any security systems installed on target computing device 202. Identification module 106 may then fail to identify any security systems installed on target computing device 202 while searching the information about target computing device 202.

In some examples, cloud-based server 206 may authenticate one or more computing devices included in the computer network. For example, authentication module 112 may, as part of cloud-based server 206, authenticate target computing device 202 and/or networking device 208 upon joining the computer network. By authenticating target computing device 202 and/or networking device 208 with cloud-based server 206, authentication module 112 may ensure that the computer network provides a secure computing environment in which target computing device 202 and/or networking device 208 are able to expose their security capabilities and/or vulnerabilities without the risk of exploitation by a malicious network participant.

In one example, authentication module 112 may obtain user credentials from a user of target computing device 202.

For example, authentication module 112 may enable a user of target computing device 202 to create a username and password associated with the computer network. In this example, authentication module 112 may then store the username and password created by the user of target computing device 202 in authentication database 212.

In one example, authentication module 112 may obtain the username and password of the user of target computing device 202 (on at least one occasion) to authenticate target computing device 202 with cloud-based server 206. For example, networking device 208 may detect an attempt by target computing device 202 to join the computer network. In this example, upon detecting the attempt by target computing device 202 to join the computer network, networking device 208 may request the username and password of the user of target computing device 202.

In one example, networking device 208 may receive the username and password of the user of target computing device 202 in response to the request. In this example, upon receiving the username and password of the user of target computing device 202, networking device 208 may provide the username and password to authentication module 112. Authentication module 112 may then authenticate target computing device 202 with cloud-based server 206 by searching authentication database 212 for the username and password and identifying the same during the search.

In a similar example, authentication module 112 may obtain user credentials from a user of networking device 208. For example, authentication module 112 may enable a network administrator associated with networking device 208 to create a username and password associated with the computer network. In this example, authentication module 112 may then store the username and password created by the network administrator in authentication database 212.

In one example, authentication module 112 may obtain the username and password of the network administrator associated with networking device 208 (on at least one occasion) to authenticate networking device 208 with cloud-based server 206. For example, the network administrator may boot up networking device 208 to begin facilitating transmission of data packets within the computer network. In this example, during the boot-up process, networking device 208 may request the username and password of the network administrator associated with networking device 208.

In one example, networking device 208 may receive the username and password of the network administrator in response to the request. In this example, upon receiving the username and password of the network administrator, networking device 208 may provide the username and password to authentication module 112. Authentication module 112 may then authenticate networking device 208 with cloud-based server 206 by searching authentication database 212 for the username and password and identifying the same during the search.

In some examples, cloud-based server 206 may obtain information 210 from one or more users and/or computing devices included in the computer network. For example, information module 114 may, as part of cloud-based server 206, query target computing device 202 and/or networking device 208 for information about target computing device 202. Additionally or alternatively, information module 114 may query a user of target computing device 202 and/or an administrator associated with networking device 208 for information about target computing device 202. In response to such queries, information module 114 may receive information about target computing device 202 via a secure communication protocol (such as Hypertext Transfer Protocol Secure (HTTPS)) and store the same as information 210 on cloud-based server 206.

In some examples, authentication module 112 may provide target computing device 202 with an authentication token during the authentication process. For example, authentication module 112 may provide target computing device 202 with authentication token 214 configured to direct target computing device 202 to update information 210. In one example, authentication token 214 may direct target computing device 202 to update information 210 on a periodic basis (e.g., once a week). In another example, authentication token 214 may direct target computing device 202 to update information 210 in response to detecting at least one modification to security system 216 (e.g., a security update, a change in the current status of the security system, and/or a new security system) or the device's network address (e.g., a new network address).

In one example, authentication token 214 may direct target computing device 202 to provide authentication module 112 with an update that identifies the modification to security system 216 or the device's network address. In this example, authentication module 112 may receive the update from target computing device 202 via the secure communication protocol. Authentication module 112 may then update information 210 to account for the modification to security system 216 or the device's network address based at least in part on the update received from target computing device 202.

As illustrated in FIG. 3, at step 306 one or more of the various systems described herein may determine that the security system installed on the target computing device does not satisfy a predefined security standard. For example, determination module 108 may, as part of networking device 208, determine that security system 216 installed on target computing device 202 does not satisfy a predefined security standard. The phrase "predefined security standard," as used herein, generally refers to any type or form of qualification or requirement that a security system installed on a target computing device be able to perform a particular security analysis on a network data packet.

The systems described herein may perform step 306 in a variety of ways. In some examples, determination module 108 may identify a predefined security standard imposed by the computer network. In such examples, determination module 108 may determine that the predefined security standard requires network data packet 118 to undergo a particular security analysis. Examples of this security analysis include, without limitation, one or more particular IDS analyses, IPS analyses, antivirus analyses, firewall analyses, reputation-based security analyses, heuristic-based security analyses, signature-based security analyses, combinations of one or more of the same, and/or any other suitable security analyses.

In some examples, determination module 108 may access information about security system 216 installed on target computing device 202 to determine whether security system 216 satisfies the predefined security standard. For example, determination module 108 may access the information about security system 216 stored locally on networking device 208. In another example, determination module 108 may access information about security system 216 stored remotely on cloud-based server 206. In a further example, determination module 108 may access information about security system 216 via the Internet.

In some examples, upon accessing the information about security system 216, determination module 108 may compare the information about security system 216 with the predefined security standard to determine whether security system 216 is currently able to perform the security analysis required by the predefined security standard. For example, determination module 108 may identify the security capabilities of security system 216 as specified in the information about security system 216. In this example, determination module 108 may compare the security capabilities of security system 216 with the security analysis required by the predefined security standard.

Determination module 108 may then determine that security system 216 is currently unable to perform the security analysis required by the predefined security standard based at least in part on this comparison. As will be described in greater detail below, by determining that security system 216 installed on target computing device 202 satisfies the predefined security standard, determination module 108 may enable security module 110 to eliminate redundant security analyses performed on network data packet 118.

In some examples, determination module 108 may also determine that security system 216 satisfies a different security standard. For example, determination module 108 may identify a different security standard imposed by the computer network. In this example, determination module 108 may determine that the different predefined security standard requires network data packet 118 to undergo a different security analysis. Examples of this different security analysis include, without limitation, one or more particular IDS analyses, IPS analyses, antivirus analyses, firewall analyses, reputation-based security analyses, heuristic-based security analyses, signature-based security analyses, combinations of one or more of the same, and/or any other suitable security analyses.

In one example, determination module 108 may compare the information about security system 216 with the different predefined security standard. In this example, determination module 108 may determine that security system 216 is currently able to perform the different security analysis required by the different predefined security standard based at least in part on this comparison.

In a specific example, determination module 108 may determine that security system 216 is unable to perform the particular IDS and IPS analyses required by the predefined security standard (since, e.g., security system 216 does not perform any IDS or IPS analyses or the IDS and IPS analyses performed by security system 216 are out-of-date). However, determination module 108 may also determine that security system 216 installed on target computing device 202 is able to perform the particular antivirus and firewall analyses required by the different predefined security standard.

As illustrated in FIG. 3, at step 308 one or more of the various systems described herein may perform a security analysis that satisfies the predefined security standard on the network data packet based at least in part on determining that the security system installed on the target computing device does not satisfy the predefined security standard. For example, security module 110 may, as part of networking device 208, perform a security analysis that satisfies the predefined security standard on network data packet 118 based at least in part on the determination that security system 216 installed on target computing device 202 does not satisfy the predefined security standard. In other words, security module 110 may perform the security analysis on network data packet 118 at networking device 208 since security system 216 installed on target computing device 202 is currently unable to perform the security analysis required by the predefined security standard.

The systems described herein may perform step 308 in a variety of ways. In some examples, security module 110 may perform the security analysis on network data packet 118 prior to forwarding the same to target computing device 202. In one example, security module 110 may determine that network data packet 118 does not pose a known security risk to target computing device 202 based at least in part on the security analysis. In this example, security module 110 may then forward network data packet 118 from networking device 208 to target computing device 202 since network data packet 118 does not pose a known security risk to target computing device 202.

In another example, security module 110 may determine that network data packet 118 poses a known security risk to target computing device 202 based at least in part on the security analysis. In this example, security module 110 may then quarantine network data packet 118 (by, e.g., preventing network data packet 118 from advancing to target computing device 202) instead of forwarding network data packet 118 from networking device 208 to target computing device 202.

In some examples, in response to the determination that security system 216 installed on target computing device 202 satisfies the different predefined security standard, security module 110 may forward network data packet 118 from networking device 208 to target computing device 202 without performing the different security analysis on network data packet 118 at networking device 208. In other words, security module 110 may forgo performing the different security analysis required by the different predefined security standard on network data packet 118 since security system 216 installed on target computing device 202 is able to perform the different security analysis on network data packet 118.

In a specific example, security module 110 may perform the IDS and IPS analyses required by the predefined security standard on network data packet 118 since security system 216 installed on target computing device 202 is unable to perform these IDS and IPS analyses. In contrast, security module 110 may forward network data packet 118 to target computing device 202 without performing the particular antivirus and firewall analyses required by the different predefined security standard since security system 216 installed on target computing device 202 is able to perform these antivirus and firewall analyses.

As explained above in connection with method 300 in FIG. 3, a computer network may eliminate redundant security analyses on network data packets destined for the authenticated computing devices. For example, a computer network may provide a secure computing environment in which authenticated computing devices are able to expose their security capabilities and/or vulnerabilities without the risk of exploitation by a malicious network participant. As a user of a computing device attempts to join the computer network, the user may need to perform a one-time authentication of his or her computing device with the network's cloud-based server. During this authentication process, the user's computing device may provide the network's cloud-based server with information that identifies any security system currently installed on the computing device.

The cloud-based server may receive the information from the user's computing device and then provide the information to the network's gateway device upon request. For example, the user of the computing device may attempt to download a file from the Internet. As the file enters the computer network en route to the user's computing device, the network's gateway device may intercept the file and query the cloud-based server for the information that identifies the security system installed on the user's computing device. In response to this query from the network's gateway device, the cloud-based server may provide the gateway device with the information that identifies the security system installed on the user's computing device.

The network's gateway device may receive the information from the cloud-based server and then use the information to determine whether the user's computing device satisfies a predefined security standard imposed by the computer network. For example, the gateway device may compare the information with the predefined security standard to determine whether the security system installed on the user's computing device is currently able to perform at least one security analysis required by the predefined security standard. In this example, the gateway device may determine that the security system is currently unable to perform the security analysis required by the predefined security standard based at least in part on the comparison. Upon determining that the security system is currently unable to perform the security analysis, the gateway device may perform the security analysis on the file prior to forwarding the file to the user's computing device.

By determining that the security system installed on the user's computing device is currently unable to perform the security analysis, the gateway device may ensure that different computing devices included in the computer network do not redundantly perform the same security analysis on the file. In addition, by ensuring that different computing devices included in the computer network do not redundantly perform the same security analysis on the file, the gateway device may help preserve network resources and/or improve the network's overall performance.

Figure 5:
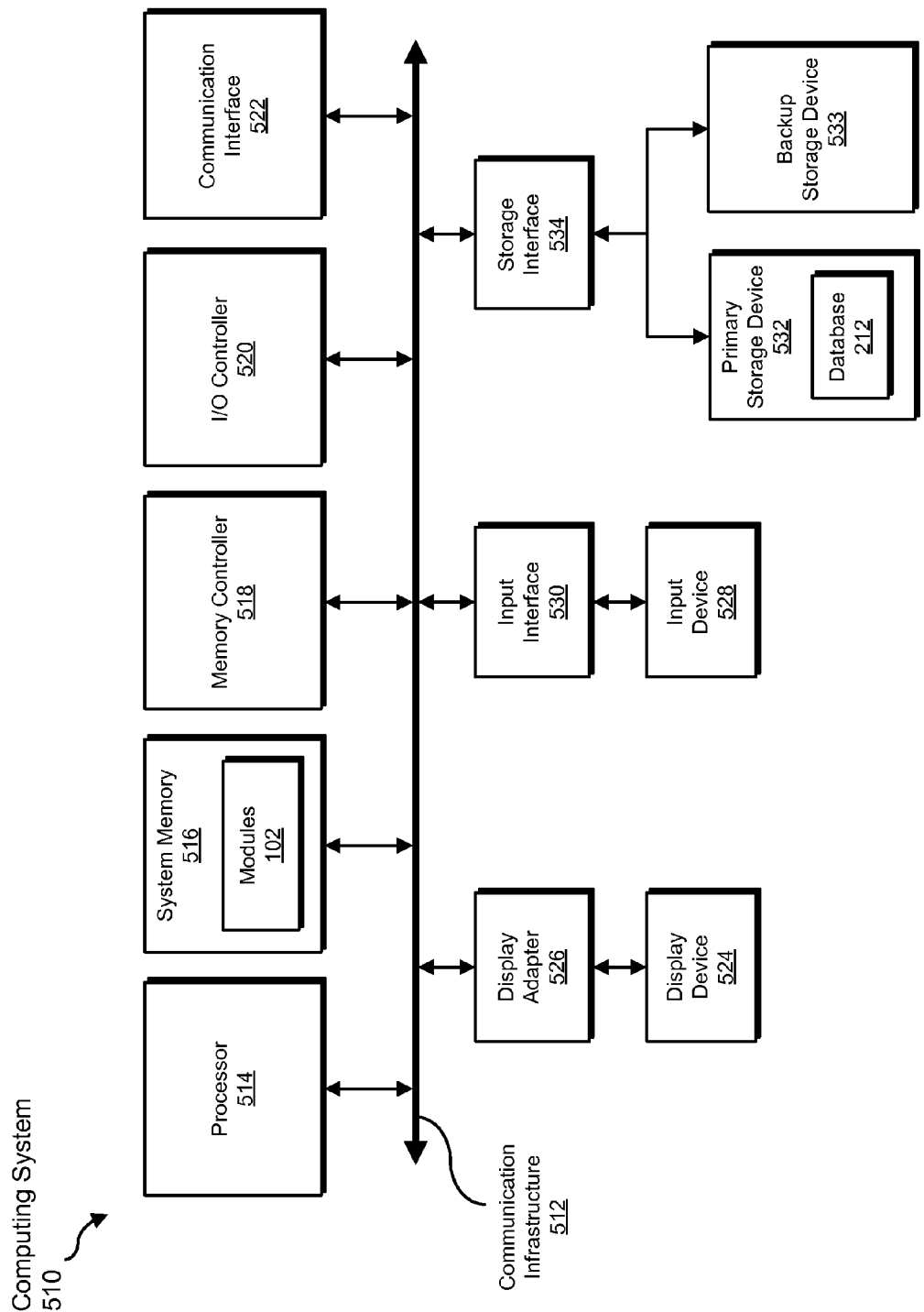
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the intercepting, identifying, determining, performing, providing, authenticating, obtaining, storing, searching, comparing, receiving, updating, forwarding, and quarantining steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 212 from FIG. 2 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
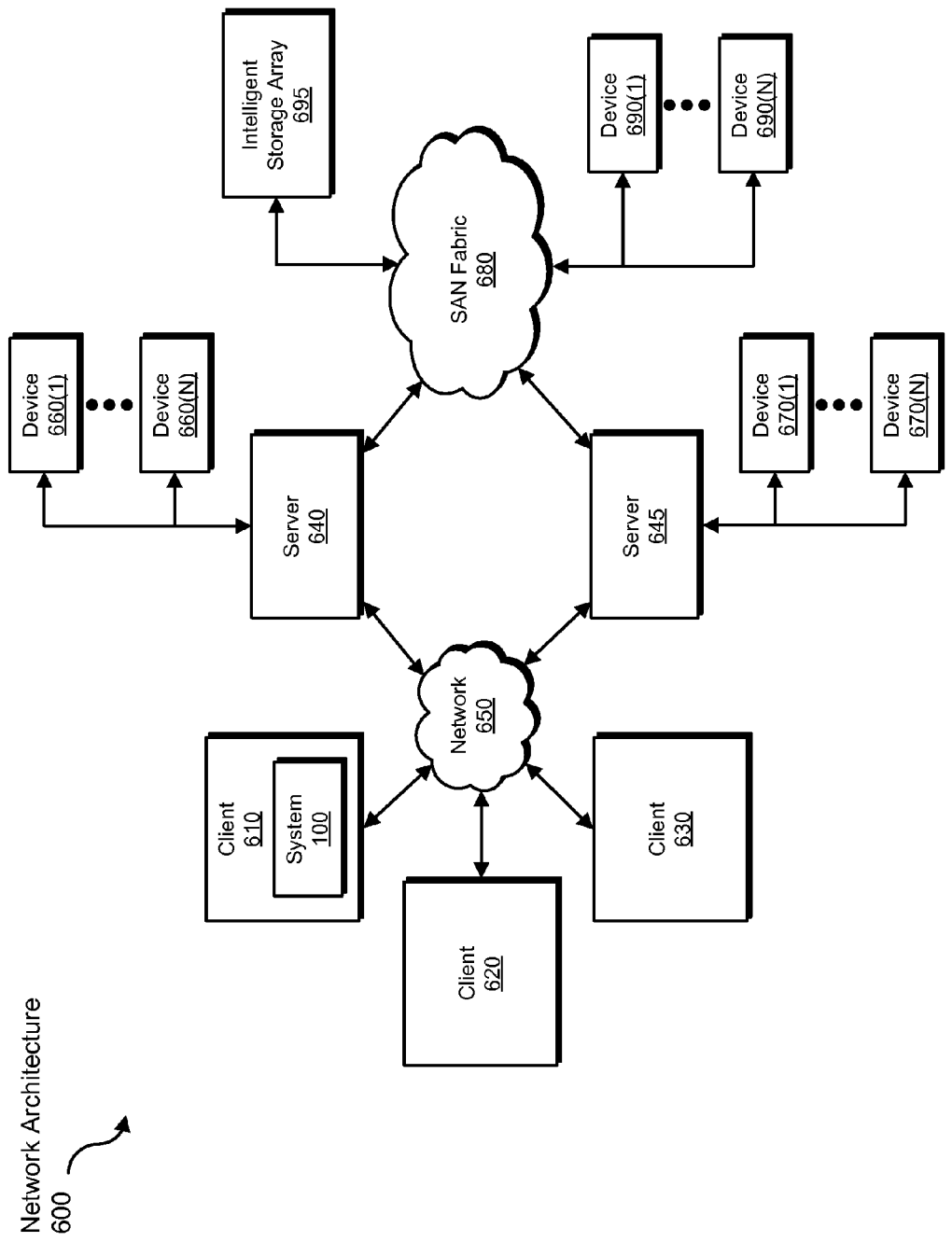
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the intercepting, identifying, determining, performing, providing, authenticating, obtaining, storing, searching, comparing, receiving, updating, forwarding, and quarantining steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for eliminating redundant security analyses on network data packets.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may intercept at least one network data packet at a networking device, transform the network data packet, output a result of the transformation of the network data packet, and use the result of the transformation to eliminate redundant security analyses performed on the network data packet. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for eliminating redundant security analyses on network data packets, at least a portion of the method being performed by a computing device comprising at least one processor, the method comprising:
    intercepting, at a networking device, at least one network data packet destined for a target computing device;
    identifying a security system installed on the target computing device by retrieving information about the target computing device from a cloud-based server that verifies that the networking device has administrative authority over the target computing device;
    determining that the security system installed on the target computing device does not satisfy a predefined security standard;
    performing a security analysis that satisfies the predefined security standard on the network data packet at the networking device based at least in part on determining that the security system installed on the target computing device does not satisfy the predefined security standard.

2. The method of claim 1, wherein the cloud-based server:
    authenticates the target computing device;
    obtains the information about the target computing device;
    stores the information about the target computing device to enable the networking device to access the information in order to identify the security system installed on the target computing device.

3. The method of claim 2, wherein authenticating the target computing device comprises:
    obtaining user credentials from a user of the target computing device;
    searching an authentication database associated with the cloud-based server for the user credentials obtained from the user of the target computing device;
    identifying the user credentials obtained from the user of the target computing device while searching the authentication database associated with the cloud-based server.

4. The method of claim 2, wherein the information about the target computing device specifies at least one of:
    the security system installed on the target computing device;
    a current status of the security system installed on the target computing device;
    a calendar date on which the security system was most recently updated;
    a network address associated with the target computing device;
    a make or model of the target computing device.

5. The method of claim 4, wherein identifying the security system installed on the target computing device comprises:
    identifying a destination address associated with the network data packet;
    determining that the network data packet is destined for the target computing device by comparing the destination address with the network address specified in the information stored on the cloud-based server;
    upon determining that the network data packet is destined for the target computing device, identifying the security system specified in the information stored on the cloud-based server.

6. The method of claim 2, wherein authenticating the target computing device comprises providing the target computing device with an authentication token configured to direct the target computing device to update the information stored on the cloud-based server in response to detecting at least one modification to the security system installed on the target computing device.

7. The method of claim 6, wherein obtaining the information about the target computing device comprises:
    receiving an update that identifies the modification to the security system from the target computing device;
    updating the information stored on the cloud-based server to account for the modification to the security system based at least in part on the received update.

8. The method of claim 1, further comprising:
    determining that the network data packet does not pose a security risk to the target computing device based at least in part on the security analysis;
    upon determining that the network data packet does not pose the security risk to the target computing device, forwarding the network data packet from the networking device to the target computing device.

9. The method of claim 1, further comprising:
    determining that the network data packet poses a security risk to the target computing device based at least in part on the security analysis;
    upon determining that the network data packet poses the security risk to the target computing device, quarantining the network data packet instead of forwarding the network data packet from the networking device to the target computing device.

10. The method of claim 1, further comprising:
    determining that the security system installed on the target computing device satisfies a different predefined security standard;
    forwarding the network data packet from the networking device to the target computing device without performing a security analysis that satisfies the different predefined security standard on the network data packet since the security system installed on the target computing device satisfies the different predefined security standard.

11. The method of claim 1, wherein the security analysis comprises at least one of:
    an Intrusion Detection System (IDS) analysis;
    an Intrusion Prevention System (IPS) analysis;
    an antivirus analysis;
    a firewall analysis.

12. A system for eliminating redundant security analyses on network data packets, the system comprising:
    an interception module, stored in memory, programmed to intercept, at a networking device, at least one network data packet destined for a target computing device;
    an identification module, stored in memory, programmed to identify a security system installed on the target computing device by retrieving information about the target computing device from a cloud-based server that verifies that the networking device has administrative authority over the target computing device;

a determination module, stored in memory, programmed to determine that the security system installed on the target computing device does not satisfy a predefined security standard;

a security module, stored in memory, programmed to perform a security analysis that satisfies the predefined security standard on the network data packet at the networking device based at least in part on the determination that the security system installed on the target computing device does not satisfy the predefined security standard;

at least one hardware processor configured to execute the interception module, the identification module, the determination module, and the security module.

13. The system of claim 12, wherein the cloud-based server comprises:

an authentication module programmed to authenticate the target computing device;

an information module programmed to:
obtain the information about the target computing device;
store the information about the target computing device to enable the networking device to access the information in order to identify the security system installed on the target computing device.

14. The system of claim 13, wherein the authentication module is programmed to:

obtain user credentials from a user of the target computing device;

search an authentication database associated with the cloud-based server for the user credentials obtained from the user of the target computing device;

identify the user credentials obtained from the user of the target computing device while searching the authentication database associated with the cloud-based server.

15. The system of claim 13, wherein the information about the target computing device specifies at least one of:

the security system installed on the target computing device;
a current status of the security system installed on the target computing device;
a calendar date on which the security system was most recently updated;
a network address associated with the target computing device;
a make or model of the target computing device.

16. The system of claim 15, wherein the identification module is programmed to:

identify a destination address associated with the network data packet;

determine that the network data packet is destined for the target computing device by comparing the destination address with the network address specified in the information stored on the cloud-based server;

identify the security system specified in the information stored on the cloud-based server upon determining that the network data packet is destined for the target computing device.

17. The system of claim 13, wherein the authentication module is programmed to provide the target computing device with an authentication token configured to direct the target computing device to update the information stored on the cloud-based server in response to detecting at least one modification to the security system installed on the target computing device.

18. The system of claim 17, wherein the information module is programmed to:

receive an update that identifies the modification to the security system from the target computing device;

update the information stored on the cloud-based server to account for the modification to the security system based at least in part on the received update.

19. The system of claim 12, wherein the security analysis comprises at least one of:

an IDS analysis;
an IPS analysis;
an antivirus analysis;
a firewall analysis.

20. A non-transitory computer-readable-storage medium comprising one or more computer-executable instructions that, when executed by at least one processor of a networking device, cause the networking device to:

intercept at least one network data packet destined for a target computing device;

identify a security system installed on the target computing device by retrieving information about the target computing device from a cloud-based server that verifies that the networking device has administrative authority over the target computing device;

determine that the security system installed on the target computing device does not satisfy a predefined security standard;

perform a security analysis that satisfies the predefined security standard on the network data packet based at least in part on the determination that the security system installed on the target computing device does not satisfy the predefined security standard.

* * * * *